United States Patent
Chou

(10) Patent No.: US 7,042,308 B2
(45) Date of Patent: May 9, 2006

(54) MECHANISM TO PREVENT SELF-ACTUATION IN A MICROELECTROMECHANICAL SWITCH

(75) Inventor: Tsung-Kuan Allen Chou, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 50 days.

(21) Appl. No.: 10/879,539

(22) Filed: Jun. 29, 2004

(65) Prior Publication Data
US 2005/0285697 A1 Dec. 29, 2005

(51) Int. Cl.
*H01P 1/10* (2006.01)
(52) U.S. Cl. ........................ 333/105; 333/262
(58) Field of Classification Search .............. 333/262, 333/101, 103, 105; 200/181
See application file for complete search history.

(56) References Cited

U.S. PATENT DOCUMENTS 6,310,339 B1 * 10/2001 Hsu et al. ................ 250/214.1
6,417,807 B1 * 7/2002 Hsu et al. ............. 343/700 MS
6,639,494 B1 * 10/2003 Bluzer ......................... 335/78
6,777,765 B1 * 8/2004 Chen et al. ................. 257/415

FOREIGN PATENT DOCUMENTS

| DE | 40 08 832 C1 | 7/1991 |
| DE | 199 50 373 A1 | 4/2000 |
| EP | 1 156 504 A | 11/2001 |
| EP | 1 288 977 A | 3/2003 |

OTHER PUBLICATIONS

PCT Search Report, mailed Oct. 28, 2005, PCT/US2005/022357.

* cited by examiner

*Primary Examiner*—Dean Takaoka
(74) *Attorney, Agent, or Firm*—Blakely, Sokoloff, Taylor & Zafman LLP

(57) ABSTRACT

According to one embodiment a microelectromechanical (MEMS) switch is disclosed. The MEMS switch includes a substrate, a bottom electrode mounted on the substrate, a top electrode mounted on the bottom electrode, an actuation electrode mounted on the substrate and a resistor coupled to the actuation electrode. The resistor prevents self-actuation at the actuation electrode whenever the switch is open.

15 Claims, 7 Drawing Sheets

MECHANISM TO PREVENT SELF-ACTUATION IN A MICROELECTROMECHANICAL SWITCH

FIELD OF THE INVENTION

The present invention relates generally to micro-electromechanical systems (MEMS) and, more specifically, the present invention relates to a MEMS switch.

BACKGROUND

Micro-electromechanical systems (MEMS) devices have a wide variety of applications and are prevalent in commercial products. One type of MEMS device is a MEMS radio frequency (RF) switch. A typical MEMS RF switch includes one or more MEMS switches arranged in an RF switch array. MEMS RF switches are ideal for wireless devices because of their low power characteristics and ability to operate in radio frequency ranges. MEMS RF switches show their promising applications in cellular telephones, wireless computer networks, communication systems, and radar systems. In wireless devices, MEMS RF switches can be used as antenna switches, mode switches, and transmit/receive switches However, a problem frequently occurs with MEMS RF switches. MEMS switches typically suffer from a problem where an actuation electrode within the switch may actuate at the "OFF" state (self-actuation) due to the high voltage RF signal. Thus, the high voltage RF signal produces adequate electrostatic force to pull down the switch beam and cause failure.

A MEMS switch may also encounter additional insertion loss (IL) through the actuation electrode/capacitor to ground due to capacitance coupling, which strongly downgrades the device's RF performance (e.g., from 0.3 dB to >1 dB).

BRIEF DESCRIPTION OF THE DRAWINGS

The present invention will be understood more fully from the detailed description given below and from the accompanying drawings of various embodiments of the invention. The drawings, however, should not be taken to limit the invention to the specific embodiments, but are for explanation and understanding only.

DETAILED DESCRIPTION

A mechanism to prevent self-actuation in a MEMS switch is described. Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

In the following description, numerous details are set forth. It will be apparent, however, to one skilled in the art, that the present invention may be practiced without these specific details. In other instances, well-known structures and devices are shown in block diagram form, rather than in detail, in order to avoid obscuring the present invention.

Figure 1:
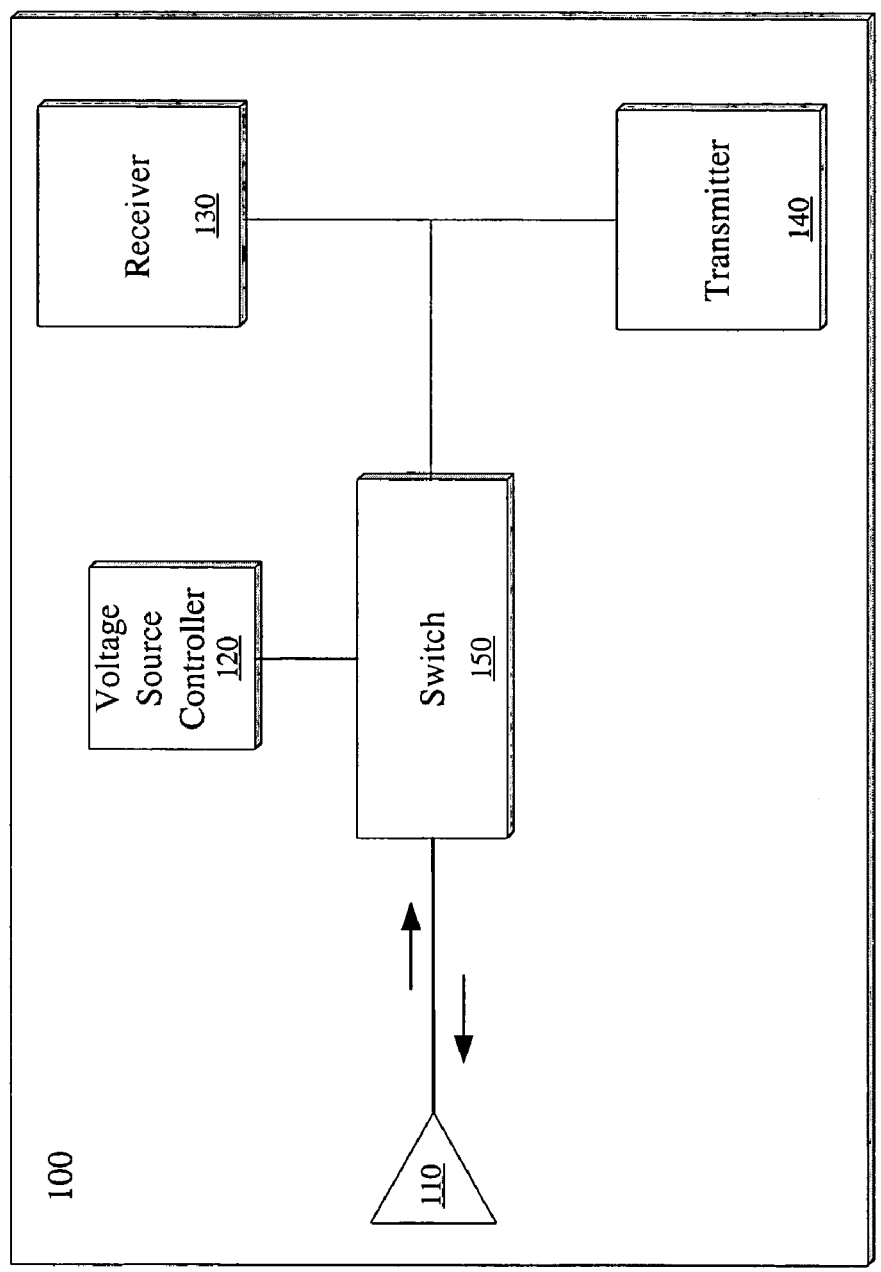
FIG. 1 illustrates one embodiment of a wireless communications system.

FIG. 1 is a block diagram of one embodiment of a wireless communication system 100. System 100 includes an antenna 110 for transmitting and receiving signals. System 100 also includes a voltage source controller 120, a receiver 130 a transmitter 140, and a MEMS switch 150 electrically coupled to antenna 110.

Voltage source controller 120 is electrically connected to MEMS switch 150. In one embodiment, voltage source controller 120 includes logic for selectively supplying voltages to actuation electrodes (not shown) within MEMS switch 150 to selectively activate switch 150. Receiver 130 processes signals that are received at system 100 via antenna 110. Transmitter 140 generates signals that are to be transmitted from system 100.

During operation, system 100 receives and transmits wireless signals. This is accomplished by voltage source controller 120 selectively activating MEMS switches 150 so that switch 150 is coupled to receiver 130 so that received signals can be transmitted from antenna 110 to receiver 130 for processing, and coupled to transmitter 140 so that transmitted signals generated by transmitter 140 can be passed to antenna 110 for transmission.

Figure 2:
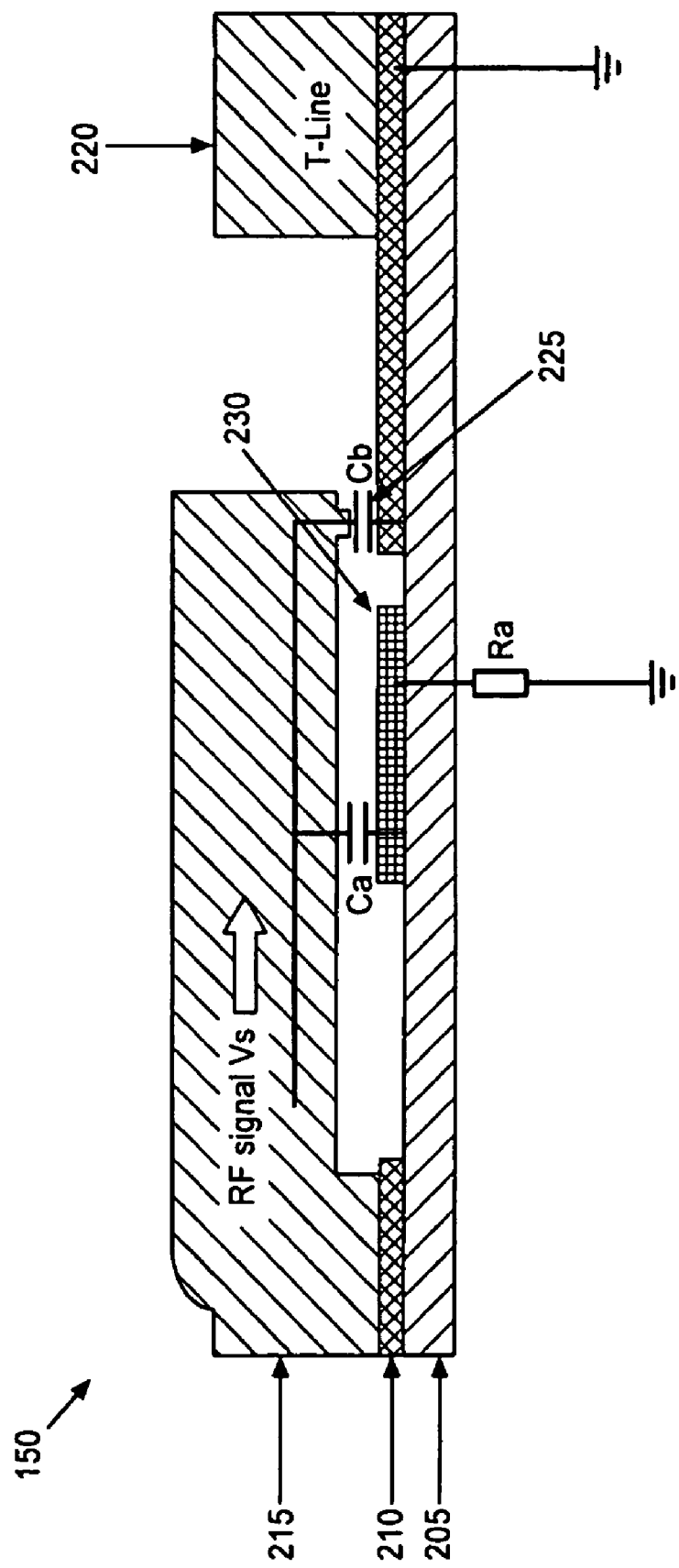
FIG. 2 illustrates one embodiment of a RF MEMS switch.

FIG. 2 illustrates one embodiment of a RF MEMS switch 150, where switch 150 is in an "Off" state. Switch 150 includes a substrate/dielectric 205, a bottom electrode 210 layered over the substrate 205, and top electrodes 215 and 220 mounted on the bottom electrode 210. Electrodes 215 and 220 carry a high voltage RF signal ("Vs") that is received or transmitted from switch 150. In particular, electrode 220 is a 50 Ω transmission line that transmits a signal whenever a contact region 225 is closed.

An actuation electrode 230 is also included. Actuation electrode 230 is mounted on substrate 205, and allows a signal to pass from electrode 215 to electrode 220 upon becoming electrically charged (or actuated). When switch 150 is in the "Off" state, the high voltage RF signal can impose its voltage Vs directly on a capacitor (Ca) coupled to actuation electrode 230 (for example, actuation capacitor), and a capacitor (Cb) in contact region 225 (e.g., contact capacitor).

Although the RF signal is at a high frequency, the RMS value of the signal may provide an adequate DC force to move top electrode 215 down, causing self-actuation at actuation electrode 230. The contact region 225 can be minimized to reduce Cb so that no adequate force is produced at contact region even with high voltage.

According to one embodiment, a resistor (Ra) is coupled between actuation electrode 230 and ground when actuation is "OFF". The resistor eliminates the potential for self-actuation at actuation electrode 230. In one embodiment, the resistor has a sufficiently high resistance (e.g., 20 kΩ) so that the impedance at the resistor is much larger than that of the capacitor Ca in corresponding to the RF signal. Consequently, there is minimum RF voltage drop between the capacitor Ca. The major voltage drop will be shifted to Ra due to its high impendence. Therefore, self-actuation of switch 150 will not occur, or at least is less likely to occur, since there will be little or no high voltage across actuation electrode 230.

Figure 3:
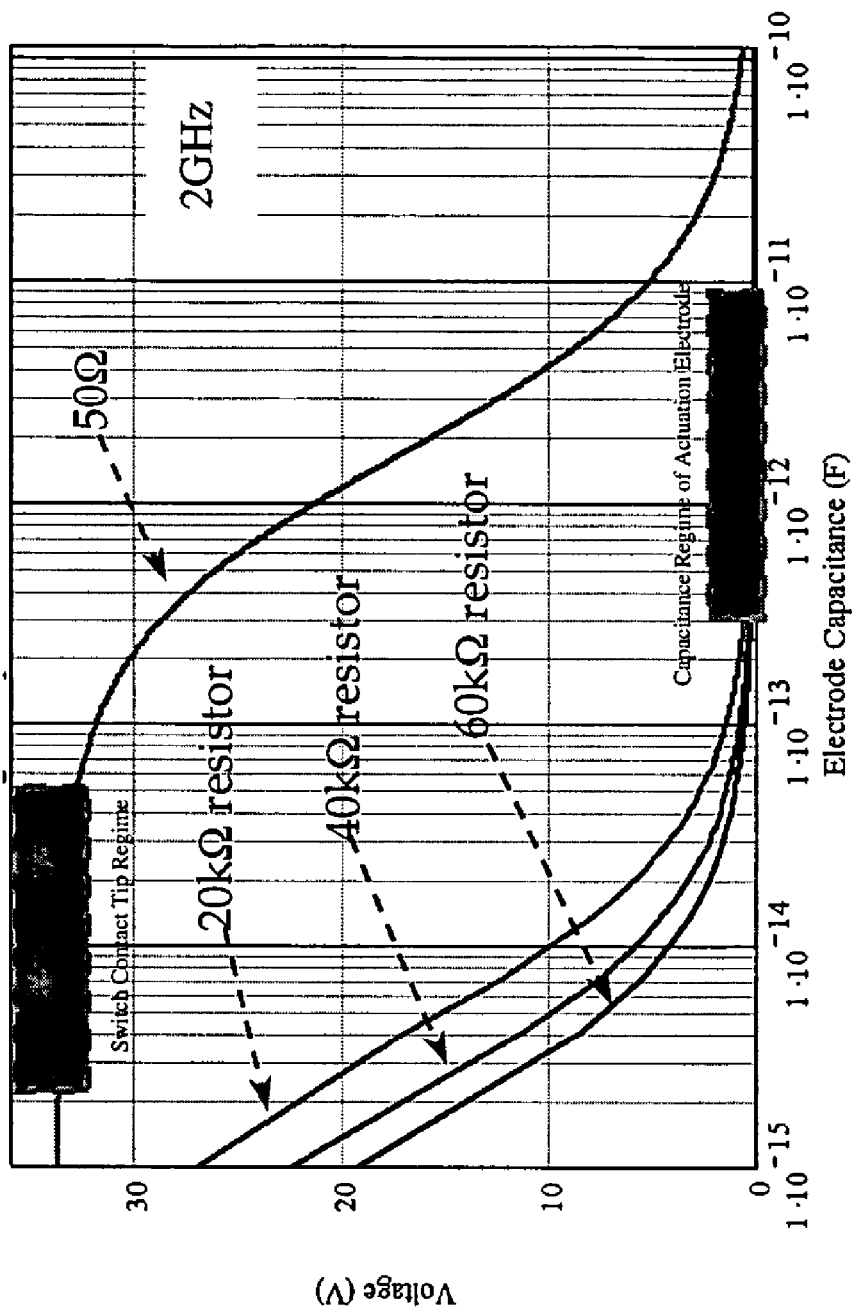
FIG. 3 is a graph illustrating one embodiment of voltage drop as a function of resistance values.

FIG. 3 is a graph illustrating one embodiment of voltage drop on capacitors Ca and Cb as a function of resistor Ra values, for a 2 GHz RF signal, and Vs=33.6V at peak. For the actuation capacitor Ca, the capacitance is in the range of pico-Farads(pF=1e-12 F). A high voltage drop (~20V) can be seen on capacitor Ca if only 50 ohm of load resistance is used. The voltage on the capacitor Ca is greatly reduced (<<1V) when the load resistance is 20 kΩ~60 kΩ.

This result demonstrates that the proper actuation resistor Ra can effectively eliminate the self-actuation from high voltage RF signal. Note, that the high RF voltage is expected on the contact region capacitor Cb as well. However, as discussed above, self-actuation in this instance may be overcome by reducing the overlap area for low force.

Figure 4:
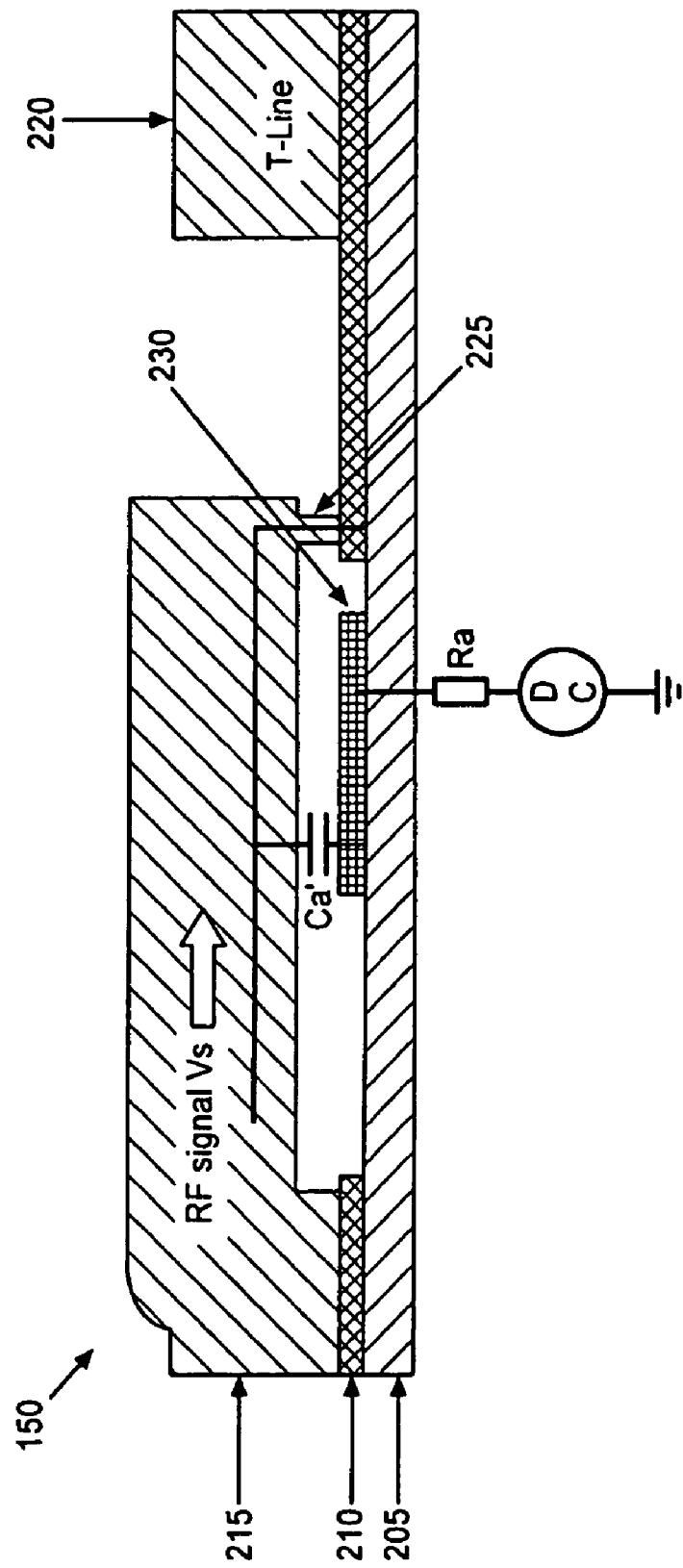
FIG. 4 illustrates another embodiment of a RF MEMS switch.

FIG. 4 illustrates one embodiment of a RF MEMS switch 150, where switch 150 is in an "On" state. The high impedance between the RF signal and the DC ground minimizes signal coupling/loss. Without the resistor, the RF signal will transmit through the contact fully. However, the RF signal may easily transmit to ground through the actuation electrode Ca' due to its low impendence at high frequency. This capacitor coupling causes partial RF signal loss and degrades the device RF performance by adding more RF insertion loss (e.g., less signal transmits through contact). The amount of this insertion loss through actuation electrode depends on the total capacitance of the closed switch (or switches connected in parallel). The loss can be as high a several dB when several switches are used in parallel, resulting high Ca'(total Ca'>1 pF).

Figure 5:
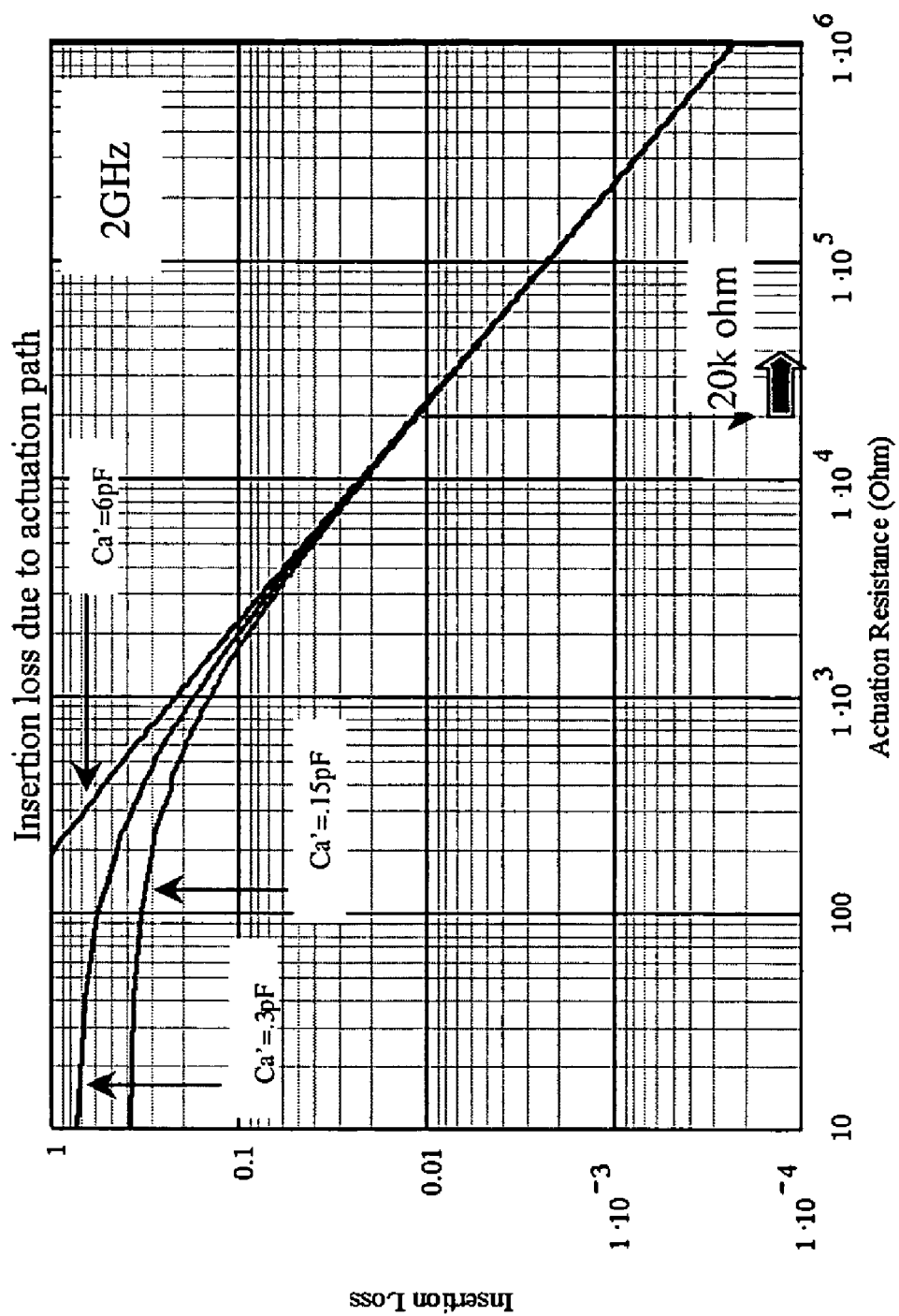
FIG. 5 is a graph illustrating one embodiment of insertion loss through an actuation electrode as a function of resistance values.

FIG. 5 is a graph illustrating one embodiment of insertion loss through actuation electrode 230 as a function of resistance values, Ra. As shown in FIG. 5, insertion loss is very high when there is low actuation resistance (e.g., <100 Ω). The higher the Ca' the more insertion loss is expected. This insertion loss is greatly reduced (<0.02 dB) when the resistance is in the range of 20 kΩ or higher. Therefore, with an adequate high resistance added to actuation electrode 230, insertion loss is minimized.

Figure 6:
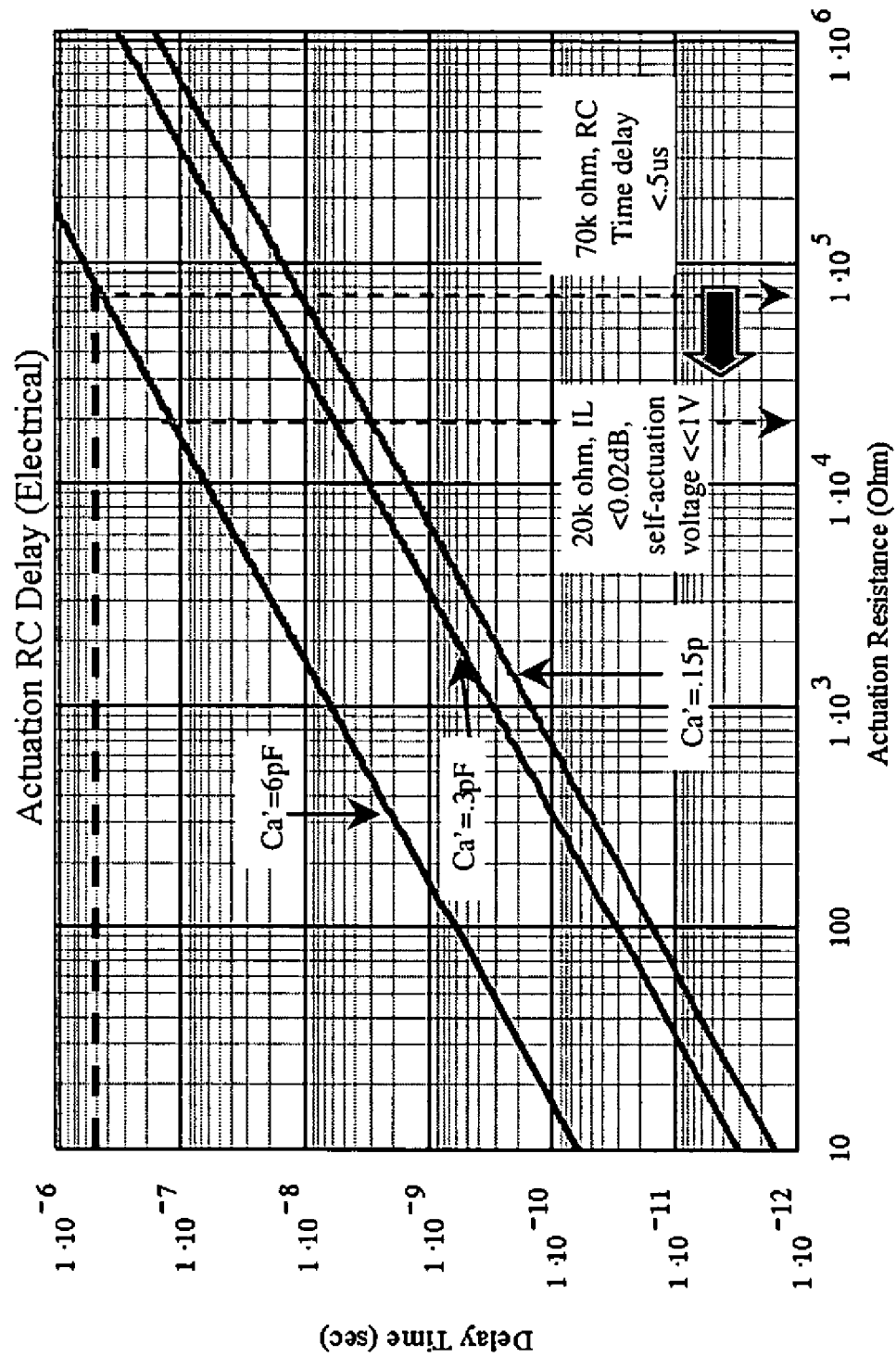
FIG. 6 is a graph illustrating one embodiment of RC time delay due to a resistor.

FIG. 6 is a graph illustrating one embodiment of RC time delay associated with resistor Ra. Typically, the mechanical response (e.g., switching speed) of a MEMS switch is in the range of 10 us. Therefore, the actuation signal time delay from the resistor is to be much less than the physical switching speed (e.g., 0.5 us). With total actuation capacitance, Ca', at 6 pF, the actuation resistor is to be 70 kΩ or lower for fast actuation. However, in order to minimize the self-actuation and action insertion loss, the resistance of the actuation resistor is to be is 20 kΩ or higher. Thus, the optimum actuation resistance is in the range of 20 k–70 k ohm.

Figure 7:
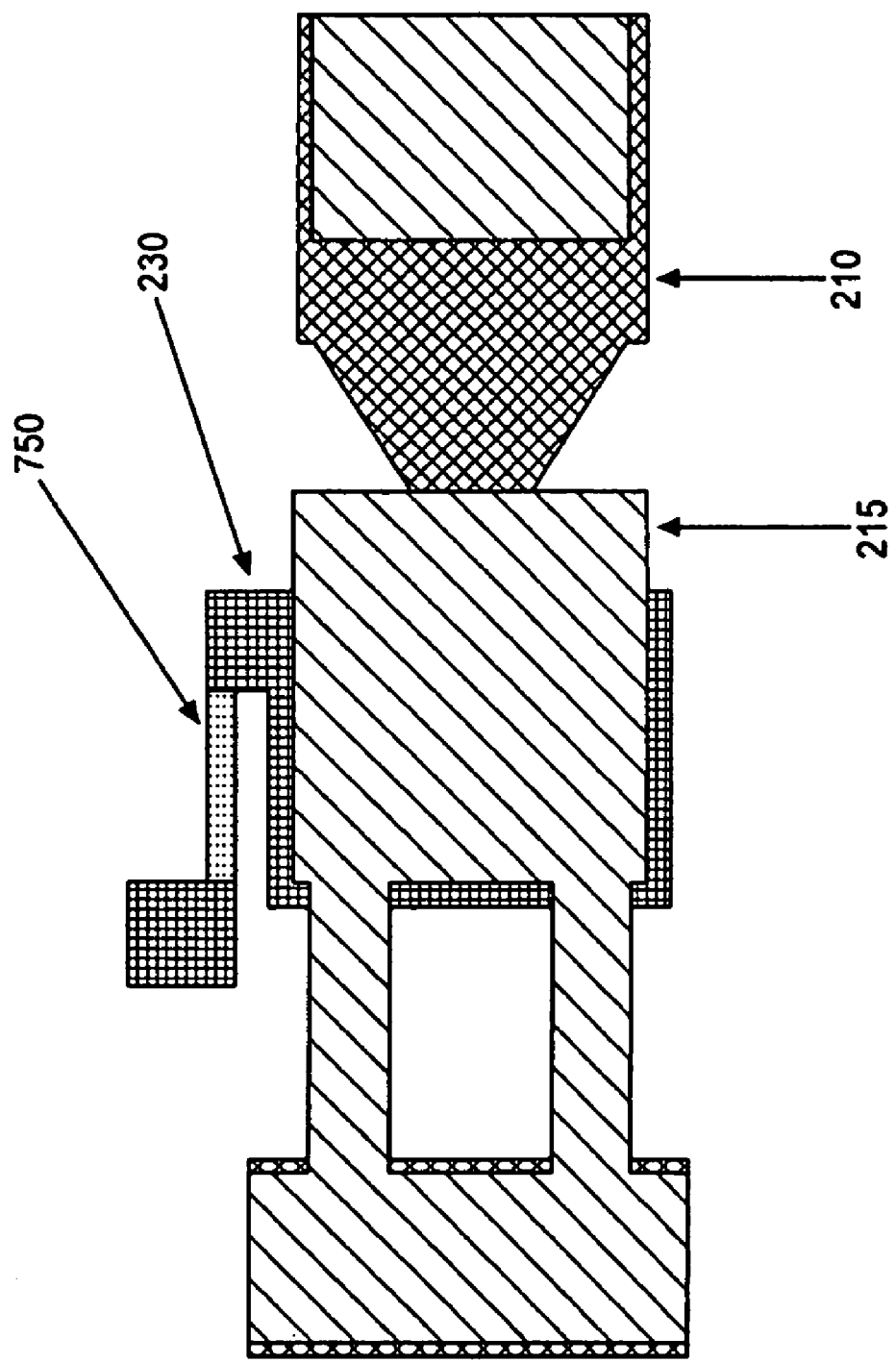
FIG. 7 illustrates one embodiment of a top view of a MEMS switch with an integrated actuation resistor.

FIG. 7 illustrates one embodiment of a top view of MEMS switch 150 with an integrated actuation resistor. According to one embodiment, an actuation resistor 750 is integrated with electrode 230 by using a polysilicon drive electrode. In such an embodiment, the drive electrode is constructed by polysilicon with a high dopant to achieve good conduction for actuation charge distribution.

Further, a certain region of the same polysilicon layer may be doped with a low implant dose to achieve adequate resistance as shown in FIG. 7. In other embodiments, different methods of integration may be implemented. For example, the high conductive polysilicon electrode may be replaced by any metal, and the poly resistor may be replaced by any other resistor.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as the invention.

What is claimed is:

1. A microelectromechanical (MEMS) switch comprising:
a substrate;
a bottom electrode mounted on the substrate;
a top electrode mounted on the bottom electrode;
an actuation electrode mounted on the substrate; and
a resistor, coupled to the actuation electrode, to prevent self-actuation at the actuation electrode and to prevent insertion loss through the actuation electrode whenever the switch is closed.

2. The switch of claim 1 further comprising a capacitor coupled to the actuation electrode, wherein the impedance of the resistor is larger than the impedance of the capacitor.

3. The switch of claim 2 wherein the impedance of the resistor has a range between 20 KΩ and 70 KΩ.

4. The switch of claim 1 wherein the resistor is integrated with the actuation electrode via a polysilicon drive electrode.

5. The switch of claim 4 wherein the drive electrode is constructed with a higher dopant polysilicon to achieve sufficient conduction for actuation charge distribution.

6. A method comprising:
mounting an actuation electrode on a substrate of a microelectromechanical (MEMS) switch; and
integrating the actuation electrode with a polysilicon drive electrode to form a resistor coupled to the actuation electrode, the resistor to prevent self-actuation at the actuation electrode and to prevent insertion loss through the actuation electrode whenever the switch is closed.

7. The method of claim 6 further comprising:
mounting a bottom electrode on the substrate; and
mounting a top electrode on the bottom electrode.

8. A wireless communication system comprising:
a receiver to receive high voltage RF signals;
a transmitter to transmit the high voltage RF signals; and
a microelectromechanical (MEMS) switch, coupled to the receiver and the transmitter, having:
an actuation electrode; and
a resistor, coupled to the actuation electrode, to prevent self-actuation from the high voltage RF signals at the actuation electrode whenever the switch is open and to prevent insertion loss through the actuation electrode whenever the switch is closed.

9. The system of claim 8 wherein the MEMS switch further comprises a capacitor coupled to the actuation electrode, wherein the impedance of the resistor is larger than the impedance of the capacitor.

10. The system of claim 8 further comprising a voltage source controller coupled to the MEMS switch.

11. A wireless communication system comprising:
a receiver to receive high voltage RF signals;
a transmitter to transmit the high voltage RF signals;
a microelectromechanical (MEMS) switch, coupled to the receiver and the transmitter, having:
an actuation electrode; and a resistor, coupled to the actuation electrode, to prevent self actuation from the high voltage RF signals at the actuation electrode whenever the switch is open and to prevent insertion loss through the actuation electrode whenever the switch is closed; and an omni directional antenna coupled to the MEMS switch.

12. The system of claim 11 further comprising a voltage source controller coupled to the MEMS switch.

13. The system of claim 11 wherein the MEMS switch further comprises a capacitor coupled to the actuation electrode.

14. The system of claim 13 wherein the impedance of the resistor has a range between 20 K$\Omega$ and 70 K$\Omega$.

15. The system of claim 13 wherein the impedance of the resistor is larger than the impedance of the capacitor.

* * * * *